E. R. BEEMAN.
TRACTION MACHINE.
APPLICATION FILED JAN. 10, 1921.
1,419,605.
Patented June 13, 1922.
2 SHEETS—SHEET 1.
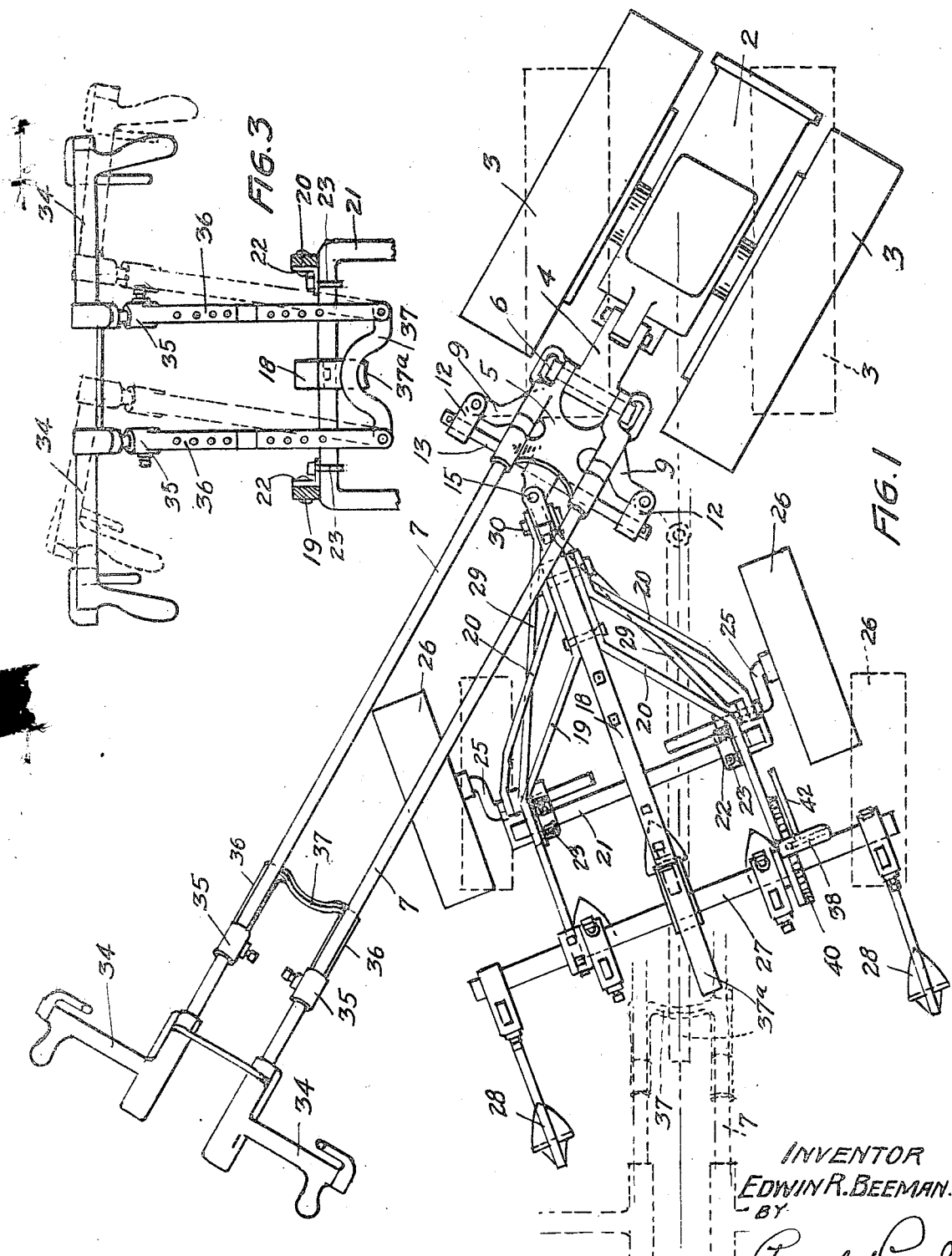
INVENTOR
EDWIN R. BEEMAN.
BY
HIS ATTORNEYS.

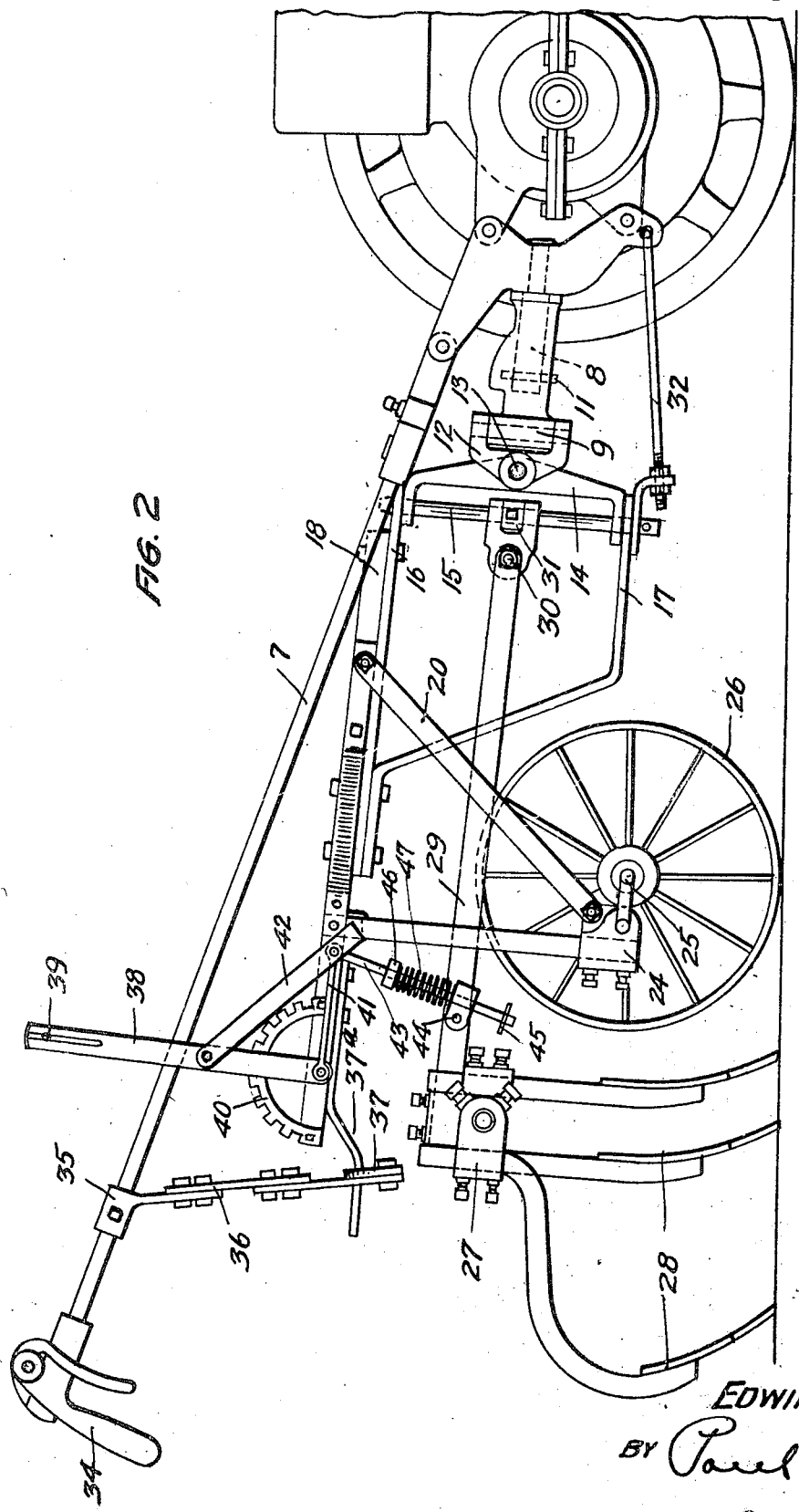

UNITED STATES PATENT OFFICE.

EDWIN R. BEEMAN, OF MINNEAPOLIS, MINNESOTA, ASSIGNOR TO BEEMAN TRACTOR COMPANY, OF MINNEAPOLIS, MINNESOTA, A CORPORATION OF MINNESOTA.

TRACTION MACHINE.

1,419,605. Specification of Letters Patent. Patented June 13, 1922.

Application filed January 10, 1921. Serial No. 436,258.

*To all whom it may concern:*

Be it known that I, EDWIN R. BEEMAN, a citizen of the United States, resident of Minneapolis, county of Hennepin, State of Minnesota, have invented certain new and useful Improvements in Traction Machines, of which the following is a specification.

My invention relates to the type of traction machine shown and described in the Peters Patent No. 1,245,121, October 30, 1917, and in the Beeman and Peters Patent No. 1,288,805, December 24, 1918, and the primary object of the invention is to provide a connecting means between the steering posts of the traction machine and the trailer which will perform all the functions of the lifting straps of the steering devices of said patents in guiding the machine through the rocking of the posts on a longitudinal axis combined with downward pressure thereon, and in addition to this steering function, said connecting means will also allow a lifting freedom of the steering device and its complete trailer frame whenever the operator desires to change the direction of movement of the machine, thereby avoiding the necessity of lifting the trailer frame or the implements in making such a change.

The invention consists generally in various constructions and combinations, all as hereinafter described and particularly pointed out in the claims.

In the accompanying drawings forming part of this specification,

Figure 1 is a plan view of a traction machine with my invention applied thereto, Figure 2 is a side elevation of the same, Figure 3 is an end view showing the manner of applying the pressure of the steering posts to the frame beneath.

In the drawing, 2 represents the frame of an internal combustion engine, having supporting traction wheels 3 and a yoke 4 attached to the engine frame and supporting a casting 5 by means of a horizontal bolt pivot 6. In this casting steering posts 7 are journaled for rotary movement on a longitudinal axis. A pin 8 projects rearwardly from the yoke 4 and on this pin a draw-bar yoke 9 is swiveled and held by suitable means, such as a pin 11. Upon each end of the yoke 9 clevises 12 are mounted and a rod 13 has horizontal bearings in these clevises. A yoke 14 is mounted on the rod 13 and the rear or trailer frame is connected to said yoke by means of a long vertical king-bolt 15, which passes through the ends of the yoke and through fork members 16 and 17. These fork members are rigidly secured to a central supporting bar 18, the upper fork member and the bar being arranged near the level of the upper end of the yoke 14 and the lower fork member 17 being bent outwardly to meet the yoke 14 and the fork member 16, as shown in Figure 2. Diagonal braces 19 and 20 are secured to the bar 18 and extend rearwardly to a yoke 21 to which they are rigidly secured by angle plates 22 and U-bolts 23. This yoke 21 is in the form of an inverted U and is provided at its lower ends with collars 24 to which the diagonal cross braces are connected and extending forwardly and upwardly are secured to the bar 18. Axles 25 having supporting wheels 26 are mounted in said collars and are adapted for adjustment to provide vertical adjustment of the tractor frame. An implement frame 27 is provided having ground-working implements 28 thereon and a draw-bar 29 having a pivotal connection at 30 with the middle portion of the kingbolt. A collar 31 provides for vertical adjusting of the draw-bar on said bolt. This draw-bar is shown preferably composed of two arms or members, converging at their forward ends to the pivot point, but it will be understood that it may be varied, according to the character of the implement. An adjustable link 32 connects the lower portion of the king-bolt with the frame of the engine. All this mechanism heretofore described corresponds substantially to the apparatus shown and described in the co-pending application of Forrest V. Donald filed January 3, 1921, Serial No. 434,562, and I make no claim to the same herein.

In the patents above referred to, the steering of the traction machine may be effected by rotating the steering device on a longitudinal axis and oscillating the traction machine on a vertical axis to change its direction of movement. I have found in the actual operation of the machine that when the ground-working implements are pressed into the soil, except, perhaps, in very loose soil, the resistance to the lateral movement of the implements is sufficient to hold them against deviation from a straight line and the machine itself can be oscillated on a vertical axis by the movement of the steering device to one side or the other and the direction of the machine changed without changing the position of the implements in the soil. When the machine is not in use, shifting of the steering device horizontally to one side or the other to steer the machine will have the effect of moving the ground-working implements laterally also, but when these implements are thrust into the soil, the steering device will swing on its pivotal connection with the frame beneath in steering the machine without affecting the trailer frame or the implements themselves. The implements have, therefore, a rudder-like function when in their working position in the soil, being held by the pressure of the soil from swerving laterally while permitting the direction of movement of the machine to be changed by the slight rocking of the steering device on its longitudinal axis. With this rocking movement is combined a downward lateral pressure which serves to hold the implements in the soil and guide them as closely as may be desired to the plants being cultivated. This important feature of the patents above referred to is embodied in the machine of this application.

Referring to the drawings, the steering posts 7 overhang the trailer frame and are provided with suitable handle bars 34 to be grasped by the walking operator in steering the machine. Collars 35 are mounted on said posts and adjustable straps 36 depend from said collars and are provided at their lower ends with a curved or arched bar 37 that is pivotally connected with the lower ends of the straps 36 and is adapted to rest on the tongue 37ª secured to the underside of the bar 18 and projecting rearwardly therefrom, forming substantially a continuation of said bar to transmit the pressure of the driver from the handle bars down through the lifting straps to the trailer frame beneath. The arch of the bar 37 centers it upon the tongue and prevents it from slipping endwise thereon during the operation of guiding the machine. A hand lever 38 having a suitable lock device 39 operates in a notched quadrant 40 and is supported upon a projecting end of one of the braces and is provided with a crank arm 41 that is connected to a link 42 and an eye-bolt 43. The eye-bolt passes loosely through a block 44 that is mounted on one end of the draw-bar and is provided with a pin 45, collar 46 and spring 47. By means of this lever and its connections, the ground-working implements may be lifted from the ground and their tension adjusted.

With this attachment to the steering device the walking operator can guide the machine and control the position of the implements in the soil in substantially the same manner and with the same result as with the permanent connections of the machines of the patents above described, the yoke, when seated on its supporting tongue, being free to rock or tilt vertically and adjust itself to the different positions of the straps and the steering device to enable the operator to apply downward or lateral pressure to the frame and implements as may be desired.

If the connection between the steering posts and the bar 8 was permanent or non-separable, it would be necessary in moving the posts to the position shown in Figure 1 to lift the entire trailer frame and this, of course, is oftentimes laborious and unnecessary. I have therefore mounted the arched bar 37 so that when the parts are all in alignment for straight-away movement, the bar 37 and the tongue 37ª will have all the functions of a permanent connection between the posts and the frame beneath, transmitting the pressure from the posts as they are swayed from side to side in guiding the machine, but the moment it is desired to make an extreme lateral movement of the posts, as in turning or quickly changing the direction of movement of the machine, the bar 37 may be lifted clear of the tongue 37ª and becoming entirely disconnected therefrom, will allow the posts and the trailer frame to perform their functions entirely independent of the straps 36 and the bar supported thereby. In this way I avoid lifting the frame or implement when it is desired to move the posts to an extreme lateral position, as in abruptly changing the direction of movement of the machine.

This invention is shown in connection with the traction machine having a trailer frame or what may be termed a four wheel tractor with a walking operator, but it will be understood that this separable connection comprising the yoke and supporting straps depending from the steering posts may be used with any other type of machine, wherever it is desirable to effect quick separation of the steering posts from the frame or implements beneath.

I claim as my invention:

1. A traction machine comprising a source of motive power and supporting tractive means therefor, a steering device connected with said source of motive power for oscillating it and said tractive means on a vertical axis to steer the machine, a frame connected with said source of motive power, and means supported by said steering device for transmitting a guiding movement from said device to said frame, said means becoming separated from said frame when said device is lifted.

2. A traction machine comprising a source of motive power, a supporting tractive means therefor, a steering device connected with said source of motive power for oscillating it and said tractive means on a vertical axis to steer the machine, a frame connected with said source of motive power, a yoke supported by said steering device for transmitting a guiding movement from said post to said frame, said yoke rocking on its bearing with the movement of said steering device and becoming separated from said frame and allowing said frame and steering device to move in opposite directions when said steering device is moved laterally to change the direction of travel of said traction machine.

3. A machine of the class described comprising a source of motive power and supporting tractive means therefor, a steering device connected with said source of motive power for oscillating it and said tractive means on a vertical axis to steer the machine, a frame connected with said source of motive power and having carrying wheels, a yoke member having a seat on said frame and pivotally connected with said steering device, said yoke member transmitting movement and pressure of said steering device in guiding the machine to said frame and becoming separated therefrom, and allowing freedom of movement of said steering device when it is lifted.

4. A traction machine comprising a source of motive power and supporting tractive means therefor, steering posts connected with said source of motive power for oscillating it and said tractive means on a vertical axis to steer the machine, a frame connected with said source of motive power, and means supported by said posts and adapted to bear on said frame without being connected thereto for transmitting a guideing movement to said frame, a lifting movement of said posts separating said means from said frame.

5. A traction machine comprising a source of motive power, a supporting tractive means therefor, steering posts connected with said source of motive power and mounted to rotate on a longitudinal axis and having a lateral movement for oscillating said source of motive power and said tractive means on a vertical axis to steer the machine, a frame pivotally connected with said source of motive power, straps pivotally connected with said posts and depending therefrom, a yoke member pivotally connected with said straps and adapted to be seated on said frame, rotation of said posts on a longitudinal axis rocking said yoke vertically on its bearing and transmitting pressure from said posts to said frame.

6. A traction machine comprising a source of motive power, and supporting tractive means therefor, steering posts connected with said source of motive power for oscillating it and said tractive means on a vertical axis to change the direction of movement, a frame connected with said source of motive power, a yoke having an arched middle portion adapted to be seated on said frame, straps pivotally connected with the ends of said yoke and with said posts, oscillation of said posts on a longitudinal axis with lateral downward pressure thereon operating to guide the machine, said lateral downward pressure being transmitted through said straps and yoke to said frame and the arch of said yoke preventing endwise movement thereof on its bearing.

7. A traction machine comprising a source of motive power and supporting tractive means therefor, steering posts connected with said source of motive power for oscillating it and said tractive means on a vertical axis to steer the machine, a frame connected with said source of motive power, a yoke having an arched middle portion adapted to be seated on said frame, and straps pivotally connecting said yoke with said posts, downward pressure on said posts being transmitted through said straps and yoke to said frame, lifting movement of said posts separating said yoke from said frame.

8. A traction machine comprising a source of motive power and supporting tractive means therefor, steering posts connected with said source of motive power for oscillating it and said tractive means on a vertical axis to steer the machine, a frame connected with said source of motive power and having carrying wheels and a rearwardly projecting bar, and means supported by said posts and adapted to rest on said bar and transmit the guiding movement of said posts to said bar, upward and lateral movement of said posts separating them and said pressure transmitting means from said bar.

9. A traction machine comprising a source of motive power and a supporting tractive means therefor, a steering post connected with said source of motive power for oscillating it and said tractive means on a vertical axis to steer the machine, a frame connected with said source of motive power and means supported by said steering post and mounted to transmit downward pressure from said post to said frame in steering the machine, and said means being separable from said frame when said post is moved laterally.

10. A traction machine comprising a source of motive power and supporting tractive means therefor, a steering device connected with said source of motive power for oscillating it and said tractive means on a vertical axis to steer the machine, a frame connected with said source of motive power, means for temporarily connecting said steering device with said frame for transmitting downward pressure from said steering device to said frame, said means having a rocking bearing on said frame and adapting itself to the lateral movement of said steering device, said means becoming separated from said frame upon lifting said steering device.

11. A traction machine comprising a source of motive power and supporting tractive means therefor, a steering device connected with said source of motive power for oscillating it and said tractive means on a vertical axis to steer the machine, a frame connected with said source of motive power, and means mounted to guide said frame from said steering device and becoming separated from one of them when said steering device is lifted.

12. A traction machine comprising a source of motive power and supporting tractive means therefor, a steering device connected with said source of motive power for oscillating it and said tractive means on a vertical axis to steer the machine, a frame connected with said source of motive power, means for transmitting downward pressure from said steering device to said frame, said means being mounted to permit separation of said steering device and said frame when said device is moved laterally.

In witness whereof, I have hereunto set my hand this 5" day of January 1921.

EDWIN R. BEEMAN.